United States Patent [19]
Kunze

[11] Patent Number: 4,962,438
[45] Date of Patent: Oct. 9, 1990

[54] MAGNETIC HEAD MOUNTING PLATE WITH TAPE MOVEMENT LIMITING SURFACE

[75] Inventor: Norbert Kunze, Ehringshausen, Fed. Rep. of Germany

[73] Assignee: U.S. Philips Corporation, New York, N.Y.

[21] Appl. No.: 336,193

[22] Filed: Apr. 11, 1989

[30] Foreign Application Priority Data

Apr. 14, 1988 [DE] Fed. Rep. of Germany ....... 3812362

[51] Int. Cl.$^5$ ...................... G11B 15/60; G11B 5/105
[52] U.S. Cl. ............................... 360/130.21; 360/129; 360/130.31
[58] Field of Search .............. 360/130.21, 129, 130.31, 360/130.3, 130.33, 122, 128, 132

[56] References Cited

U.S. PATENT DOCUMENTS

| | | | |
|---|---|---|---|
| 4,307,427 | 12/1981 | Kawachi | 360/128 X |
| 4,646,186 | 2/1987 | Tsuchiya et al. | 360/130.21 |
| 4,894,737 | 1/1990 | Hamama et al. | 360/130.21 X |

FOREIGN PATENT DOCUMENTS 0120518 10/1984 European Pat. Off. ......... 360/130.2
49-144208 12/1974 Japan .

Primary Examiner—Robert S. Tupper
Assistant Examiner—Alfonso Garcia

[57] ABSTRACT

A magnetic-tape-cassette apparatus (1) includes a head-mounting plate (10) and a magnetic head (3) arranged on the head-mounting plate (10) and having a cylindrical tape-contact face (12) and an air gap (25). The magnetic head (13) forms part of a head unit comprising a head support (16) which, viewed in the direction of tape transport, includes a tape guide (18) before and after the magnetic head (13), which tape guide has cylindrically curved guide surfaces (21) which at one side are bounded by alignment surfaces (23) at one of their axial ends. Each of the guide surfaces (21) is adjoined by a control edge (24) which is inclined relative to the guide surface (21) to urge the magnetic tape against the relevant alignment surface (23) during tape transport, the axial length of the guide surfaces (21) being smaller than or equal to the tape width (b). At a distance from the guide surface (21) each control edge (24) of the head support (16) changes to a movement-limiting surface (26), the distance between the facing alignment surface (23) and movement-limiting surfaces (26), starting from the transition (27), being greater than the tape width (b) in such a way that as the magnetic tape (11') is lifted off the guide surfaces (21) while the magnetic tape remains in contact with the tape-contact face (12) of the head (13) the position of the magnetic tape (11') in the direction of its width (22) is limited with play, said distance increasing from the centre of the relevant movement-limiting surface (26) towards its lateral edges (26a, 26b).

4 Claims, 2 Drawing Sheets

MAGNETIC HEAD MOUNTING PLATE WITH TAPE MOVEMENT LIMITING SURFACE

BACKGROUND OF THE INVENTION

The invention relates to a magnetic-tape-cassette apparatus comprising a head-mounting plate and a magnetic head arranged on the head-mounting plate and having a cylindrical tape-contact face and air gap, the magnetic head forming part of a head unit comprising a head support which, viewed in the direction of tape transport, comprises a tape guide situated before and after the magnetic head and having cylindrically curved guide surfaces bounded at one side by alignment surfaces at each time one of its axial ends, an imaginary surface connecting the alignment surfaces extending perpendicularly to a plane through the air gap, a control edge adjoining each of the guide surfaces at the other axial end and being inclined relative to the guide surfaces to urge the magnetic tape with one end against the relevant alignment surface during tape transport, and the axial length of the guide surfaces being smaller than or equal to the tape width.

Such a magnetic-tape-cassette apparatus comprising a head unit and a support forming part of the head unit is known from EP-PS 0,120,518 . The advantage of the head support in this magnetic-tape-cassette apparatus is that the magnetic tape is always in the correct azimuth position during its transport over the tape-contact face. This is important when prerecorded tapes are used, which have been recorded on other apparatuses. For a correct reproduction the azimuth position of the magnetic-tape-cassette apparatus should correspond to the azimuth position of the recording apparatus. Moreover, the manufacturer of the magnetic head can manufacture the head together with the support as a complete unit. The manufacturer of the apparatus then need no longer carry out any azimuth adjustments.

When the tape is thus guided the tape runs from one tape-guide surface directly before the magnetic head past the type-contact face of the magnetic head towards the tape-guide surface directly after the head. The tape in this tape path is slightly curved and is tautened. This stiffens the tape, so that the control edges can perform their control function in that they urge the magnetic tape in one direction against the alignment surfaces. In the Cue or MSS (Music Sensing System) mode, which is used for pause detection, the magnetic head is withdrawn. The tape is then no longer urged against the alignment surfaces.

From US-PS 4,646,186 it is known to arrange a pair forks, which serve to provide tape guidance in the play mode and whose tooth spacing corresponds substantially to the tape width, in the proximity of the magnetic head and to arrange a tape-guide fork having a larger tooth spacing and intended for the Cue mode further away from the magnetic head. When the magnetic head is withdrawn only the last-mentioned tape-guide fork is active. The tape guidance at the head will then be lost. At higher tape speeds this may give rise to oscillations, which may impair the reproduction of the signals from the audio track or even result in damage to the tape edges.

SUMMARY OF THE INVENTION

It is an object of the invention to improve a magnetic-tape-cassette apparatus and a magnetic-head unit for a magnetic-tape-cassette apparatus of the type defined in the opening paragraph in such a way that also in the Cue position some kind of guidance is provided for the magnetic tape.

According to the invention this object is achieved in that at a distance from the guide surface each control edge of the head support changes to a movement-limiting surface, the distance between the facing alignment surfaces and movement-limiting surfaces, starting from the transition, being greater than the tape width in such a way that as the magnetic tape is lifted off the guide surfaces while the magnetic tape is still in contact with the tape-contact face of the head the position of the magnetic tape in the direction of its width is limited with play, said distance increasing from the centre of the relevant movement-limiting surface towards its lateral edges.

The introduction of movement-limiting surfaces does not adversely affect the function of the control edges during normal recording or playback. However, in the Cue mode the movement-limiting surfaces ensure that the lateral movement of the magnetic tape in the width direction remains within specific narrow limits. In order to guarantee that this limited guidance always functions correctly the distance between the movement-limiting surfaces and the alignment surfaces is always larger than the maximum tape width. The movement-limiting surfaces, like all the other surfaces of the support, can be formed in one piece with the support. As the surfaces which influence the tape are situated before and after the head in the direction of tape transport the support will not affect the position and function of the pressure felt of the cassette.

In a further embodiment of the invention the movement-limiting surfaces are curved cylindrically. The cylindrical curvature ensures that the tape edges are always in point contact and hardly ever in surface contact with the movement-limiting surfaces. This is important in the case of a change in height position of the tape transport before and after the magnetic-head unit. This may be caused by a faulty lace-up inside the cassette.

In a further embodiment of the invention a tangential plane to the movement-limiting surface extends substantially perpendicularly to the tape-contact face. As a result of this the movement-limiting surface extends substantially parallel to the alignment surface and it is assured that the magnetic tape, even when it is shifted on the tape-contact face transversely of the transport direction, is subsequently guided coarsely.

In a further embodiment of the invention the free ends of the movement-limiting surfaces are provided with entry surfaces which diverge relative to the alignment surfaces. The magnetic tape then always engages the support as the magnetic-head unit is moved towards the magnetic-tape cassette.

BRIEF DESCRIPTION OF THE DRAWINGS

The invention will now be described in more detail with reference to the accompanying drawings. In the drawings.

DETAILED DESCRIPTION OF THE PREFERRED EMBODIMENTS

Figure 1:
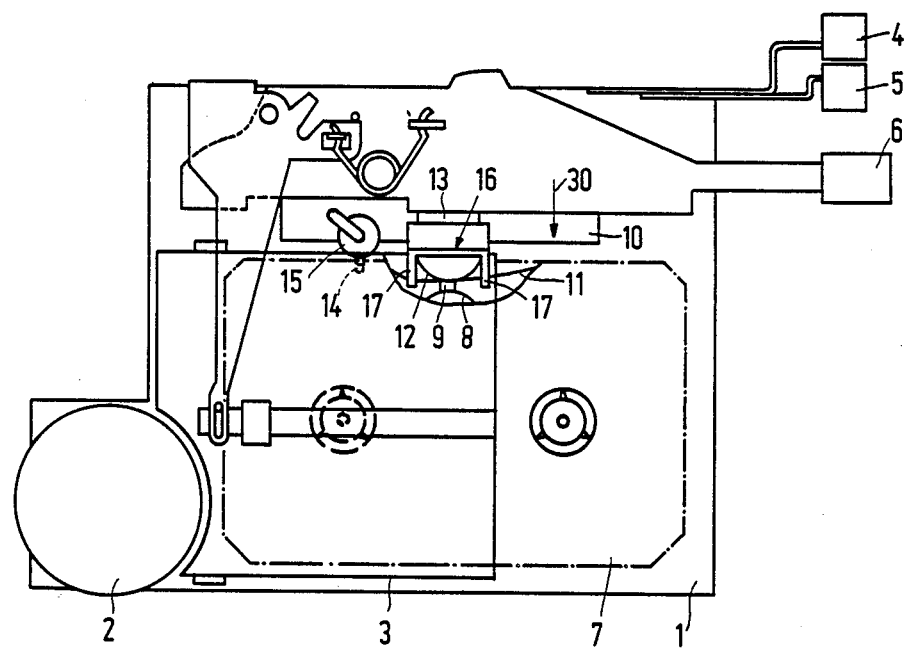
FIG. 1 shows a magnetic-tape-cassette apparatus comprising a magnetic-head unit and a head support for azimuth guidance of a magnetic tape.

FIG. 1 shows a magnetic-tape-cassette apparatus comprising a housing 1, a drive motor 2 and a cassette-holder 3. For controlling the various operating functions of the magnetic-tape-cassette apparatus three keys 4, 5, 6 are provided, which are guided in a manner, not shown, inside the apparatus. The cassette holder 3 contains a magnetic-tape cassette 7, which comprises a pressure felt 9 supported on a spring 8.

The magnetic-tape-cassette apparatus has a head-mounting plate 10, which is movable towards the magnetic-tape cassette 7 and back. A Cue position is situated between a fully retracted position and a fully advanced Play position. The drawings show the Play position. FIG. 1 shows that the pressure felt 9 presses a magnetic tape 11 against a tape-contact face 12 of a magnetic head 13.

Tape transport is provided by a capstan 14, which is pressed against a pressure roller 15. The magnetic tape 11 is passed and transported between the pressure roller and the capstan. The magnetic head 13 is arranged on the head-mounting plate 10 by means of a support 16. The support 16 and the magnetic head 13 have been factory-assembled to form a unit.

Adjacent the magnetic head the support 16 comprises projecting portions 17 between which the magnetic tape 11 passes. One of the projecting portions 17 is shown to a strongly enlarged scale in FIGS. 2 and 3, together with the magnetic head and the magnetic tape.

Figure 2:
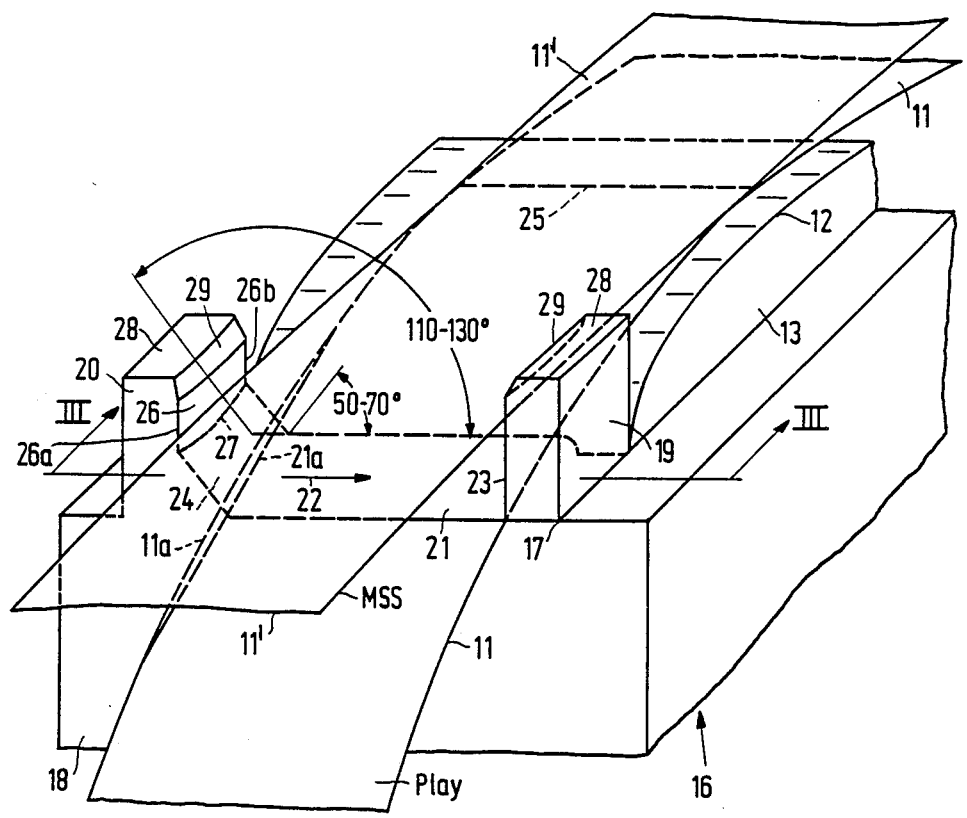
FIG. 2 shows diagrammatically a part of a magnetic head and a part of a magnetic-head support arranged on a head-mounting plate, not shown, of a magnetic-tape-cassette apparatus.
Figure 3:
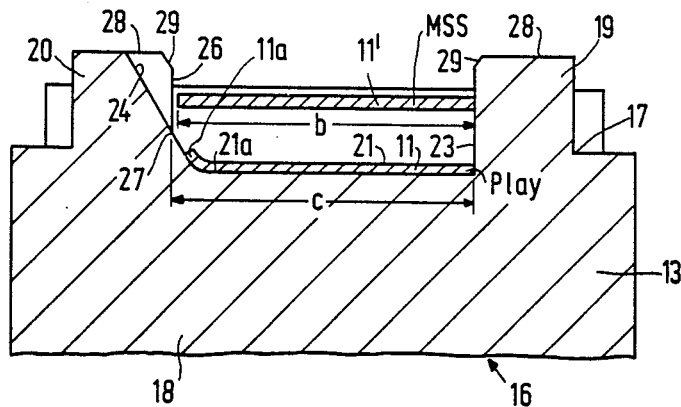
FIG. 3 is a sectional view taken on the line II—II in FIG. 1 to illustrate two different positions of the magnetic tape relative to the tape-guide surfaces of the support.

The projecting portion 17 shown in FIGS. 2 and 3 constitutes only one half of the support 16 and comprises a base 18 having laterally projecting limbs 19, 20. The base 18 has a guide surface 21 which is curved cylindrically in the width direction indicated by the arrow 22. The guide surface 21 slightly recedes relative to the tape-contact face 12 and the tangential plane thereof. This ensures that the magnetic tape 11 has a curved path between guide rollers, not shown, in the magnetic-tape cassette and the tape-contact face 12, both across the tape-contact face 12 and across the guide surface 21. This tautens the tape.

The limb 19 has an alignment surface adjoining the guide surface 21. This alignment surface 23 extends substantially perpendicularly to the tangential plane to the guide surface 21. At one end of the guide surface 21 the alignment surface is situated and at the other end of the guide surface 21 a control edge 24 is situated, which control edge is cylindrically curved like the guide surface 21. The tangential plane of the control edge and the tangential plane of the guide surface 21 form an obtuse angle of 110° to 130°. Preferably, the angle is about 120°. The distance between the alignment surface 23 and the control edge 24 at the transition 21a to the guide surface 21 is smaller than the tape width. This means that, as can be seen in FIG. 3, an edge 11a of the magnetic tape 11 always slightly contacts the control edge 24 and lies on the alignment surface 23. In this way the azimuth position of the magnetic tape relative to the air gap 25 is defined accurately. Further details on this adjustment are disclosed in EP-PS 0,120,518 (PHN 10.602). Therefore, reference is made to said document for a further explanation.

At a distance from the guide surface 21 each control edge 24 of the limbs 20 changes into a movement-limiting surface 26, which has lateral edges 26a, 26b between which the surface 26 preferably has a cylindrical curvature which in the centre of the surface has the smallest distance relative to the facing alignment surface 23. At the transition 27 the distance c between the facing alignment surface 23 and the movement-limiting surface 26 is larger than the tape width b; from the transition towards the open side the distance c remains the same. In FIGS. 2 and 3 the Play position of the tape is marked 11 and the Cue position of the tape is marked 11'. In the Cue position the magnetic tape is still in contact with the air gap 25 and the tape-contact face 12 at the location of the air gap, but it is clear of the guide surfaces 21. This Cue position serves to enable signals to be read from the tape during fast tape transport with minimal tape friction. As can be seen in FIG. 3 the position of the magnetic tape 11' in the Cue position can change to a limited extent in the direction of the tape width 22 between the alignment surface 23 and the movement-limiting surface 26.

At the free end 28 of the movement-limiting surface 26 diverging entry surfaces 29 are provided to ensure entry of the magnetic tape into the support 16, to which the magnetic head 13 is secured, when the head is moved forwards. A tangential plane to the movement-limiting surface 26 extends substantially perpendicularly to the tape-contact face 12. This means that locally the alignment surface 23 and the movement-limiting surface 26 extend substantially parallel in the direction indicated by an arrow 30 in FIG. 1, i.e. the direction of the head movement.

The head support with its component parts is moulded from plastics and can therefore be manufactured simply and accurately. Preferably, the head support is provided with snap means enabling the head support with the head to be snapped onto the head-mounting plate.

I claim:

1. A magentic-tape-cassette apparatus (1) comprising a head-mounting plate (10) and a magnetic head (13) arranged on the head-mounting-plate (10) and having a cylindrical tape-contact face (12) and air gap, the magnetic head (13) forming part of a head unit comprising a head support (16) which, viewed in the direction of tape transport, comprises first and second tape guides (18) situated, respectively, before and after the magnetic head (13), each tape guide having a cylindrical curved guide surface (21) bounded at a first side thereof by an alignment surface (23) and at a second side thereof by a control edge (24), an imaginary surface connecting the alignment surfaces (23) extending perpendicularly to a plane through the air gap, each control edge (24) being inclined relative to the corresponding guide surface (21) to thereby urge a magnetic tape (11) toward the corresponding alignment surface (23) during tape transport, and the widths of the guide surface (21) being smaller than or equal to a tape width (b), characterized in that each control edge (24) of the head support (16) changes to a movement-limiting surface (26), a distance between each alignment surface (23) and its corresponding movement-limiting surface (26), starting from a transition (27), being greater than the tape with (b) in such a way that as the magnetic tape (11) is lifted off the guide surfaces (21) while the magnetic tape is still in contact with the tape-contact face (12) of the head (13) the position of the magnetic tape (11') in the direction of its width is limited with play, said distance increasing from the center of the movement-limiting surface (26) towards its lateral edge (26a, 26b).

2. A magnetic-tape-cassette apparatus as claimed in claim 1, characterized in that the movement-limiting surfaces (26) are cylindrically curved.

3. A magnetic-tape-cassette apparatus as claimed in claim 2, characterized in that a tangential plane to the movement-limiting surface (26) extends substantially perpendicularly to the tape-contact face (12).

4. A magnetic-tape-cassette apparatus as claimed in claim 1, characterized in that entry surfaces (29) which diverge relative to the alignment surfaces (23) are provided at the free ends (28) of the movement-limiting surfaces (26).

* * * * *